United States Patent [19]
Shirley

[11] 3,888,653
[45] June 10, 1975

[54] METHOD OF PRODUCING PLANT FOOD

[75] Inventor: Samuel John Shirley, London, Ontario, Canada

[73] Assignee: Shamrock Chemicals Limited, Ontario, Canada

[22] Filed: Aug. 29, 1973

[21] Appl. No.: 392,563

[30] Foreign Application Priority Data
Oct. 23, 1972 Canada .................... 154424

[52] U.S. Cl. .................. 71/61; 71/63; 71/64 DA
[51] Int. Cl. .............................................. C05d 1/02
[58] Field of Search ...... 71/61, 63, 64 DA; 423/552

[56] References Cited
UNITED STATES PATENTS

| | | | |
|---|---|---|---|
| 1,389,862 | 9/1921 | Comment | 423/552 |
| 2,739,036 | 3/1956 | Kamenjan et al. | 23/313 X |
| 2,971,832 | 2/1961 | Stewart et al. | 71/64 DA X |
| 3,165,395 | 1/1965 | McCamy et al. | 71/64 DA X |
| 3,436,205 | 4/1969 | Davis | 71/64 DA X |
| 3,620,709 | 11/1971 | Petkousek | 71/64 DA |

FOREIGN PATENTS OR APPLICATIONS

| | | | |
|---|---|---|---|
| 209,322 | 3/1968 | U.S.S.R. | 423/552 |
| 970,744 | 9/1964 | United Kingdom | 423/552 |
| 478,217 | 1/1938 | United Kingdom | 423/552 |
| 154,111 | 11/1920 | United Kingdom | 423/552 |

*Primary Examiner*—Charles N. Hart
*Attorney, Agent, or Firm*—Wigman & Cohen

[57] ABSTRACT

Disclosed is a method of producing a fertilizer (potassium sulphate) from "spent" sulphuric acid and potash (potassium chloride) according to the following chemical equation:

$$H_2SO_4 + 2KCl \rightarrow K_2SO_4 + 2HCl \uparrow$$

11 Claims, 3 Drawing Figures

METHOD OF PRODUCING PLANT FOOD

This invention relates to a novel method of manufacturing fertilizer.

More particularly the novel method employs as a feed material, spent sulphuric acid as may be a waste product from the petroleum, munitions, and soap industries.

The concerned environmentalists over the past decade, particularly since the late 1960's, have encouraged development of techniques which recycle waste products or which eliminate pollutants. Both these factors have in recent years had an economic impact on virgin crystal sulphur (S), and virgin sulphuric acid ($H_2SO_4$). For example, as a result of the concern of melting operations to reduce the quantity of $SO_2$ emitted, during the smelting operation, from smelter stacks, scrubbers have been and are being installed to remove the $SO_2$ from the combustion gas stream. The $SO_2$ is converted, during such scrubbing, either into crystalline sulphur or to $H_2SO_4$ or to both. The crystalline sulphur has found its greatest demand in the then further production of $H_2SO_4$ whereby market saturation has been reached for sulphuric acid. The economic effect of this has been that the commercial price of sulphur, and sulphuric acid, in world markets, has over the past several years steadily declined; its leveling off point has yet to be achieved.

As those skilled in the art will know, sulphuric acid, is probably the most widely used of the industrial acids. It is used, for instance, as a reacting agent in the production of fuel from crude oil as well as in the production of domestic and industrial soaps and munitions. Both the petrochemical and soap industries require large quantities of virgin (pure) $H_2SO_4$ but their operations create waste or spent $H_2SO_4$ in large quantities. Spent sulphuric acid is sulphuric acid with impurities or contaminates absorbed or accumulated therein. Spent sulphuric acid has a typical $H_2SO_4$ concentration of between 68 percent to 92 percent (by weight) the balance being impurities, sludges, water, and alike. The composition of the impurities and the sludges depends upon the source of the spent sulphuric acid, i.e., petrochemical, soap, nitrating, and steel making industries.

Large consumers of virgin sulphuric acid usually require the vendors of the virgin sulphuric acid to contract to "take back" or to repurchase the spent sulphuric acid (since the waste product in their operation is spent sulphuric acid and has no value to them and is a difficult waste product to dispose of, particularly in recent years). This requirement of the large virgin sulphuric acid consumers to require the suppliers thereof to take back the spent sulphuric acid generates a continuing problem of disposal of spent sulphuric acid for industry generally. Some virgin sulphuric acid producers are now re-refining or purifying spent sulphuric acid but this usually is such a costly operation that it is singularly uneconomical particularly under recent economic conditions in the world markets of sulphuric acid and sulphur. As a result it is now becoming customary to put spent sulphuric acid in storage, that is, holding tanks.

The invention has as its object the use of spent sulphuric acid as a feed material for the production of fertilizer, although it also has application, as well, to the use of virgin sulphuric acid.

The invention has as its further object the utilization of a sulphuric acid mixture of which, preferably, 40 percent to 98 percent (by weight) is $H_2SO_4$.

The invention therefore contemplates a method of producing a potassium sulphate fertilizer comprising the steps of
a. selecting as a first feed material, one which has an $H_2SO_4$ component;
b. selecting, as a second feed material, one consisting essentially of potassium chloride;
c. mixing the first and second feed materials to achieve a feed mix;
d. heating the feed mix at an elevated temperature in excess of 300°F whereby the potassium sulphate fertilizer is created in fine crystalline form.

The method also includes as additional steps the pelletizing of the potassium sulphate comprising the steps of
a. mixing the crystalline potassium sulphate with granulating agents and small amounts of water until the potassium sulphate congeals into small pellets;
b. grading the pellets into a predetermined range of sizes.

The invention also contemplates that the first feed material be spent sulphuric acid.

The invention will now be described by way of example with reference to the accompanying drawings in which.

Figure 1:
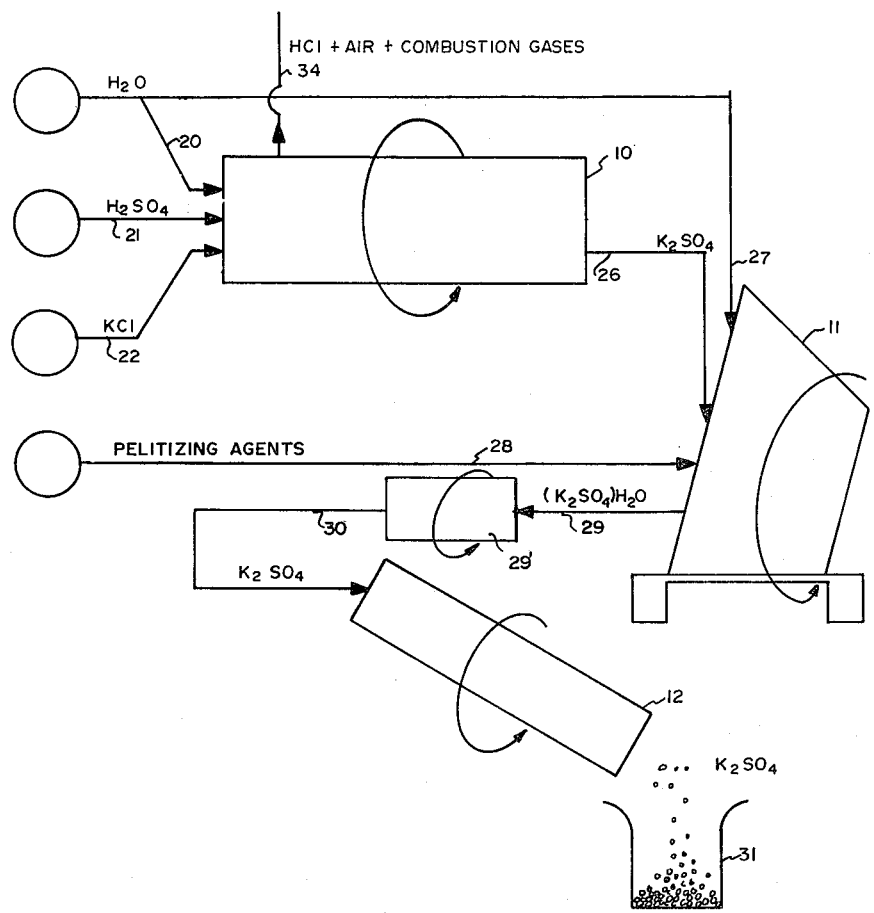
FIG. 1 is a flow diagram of the process.
Figure 2:
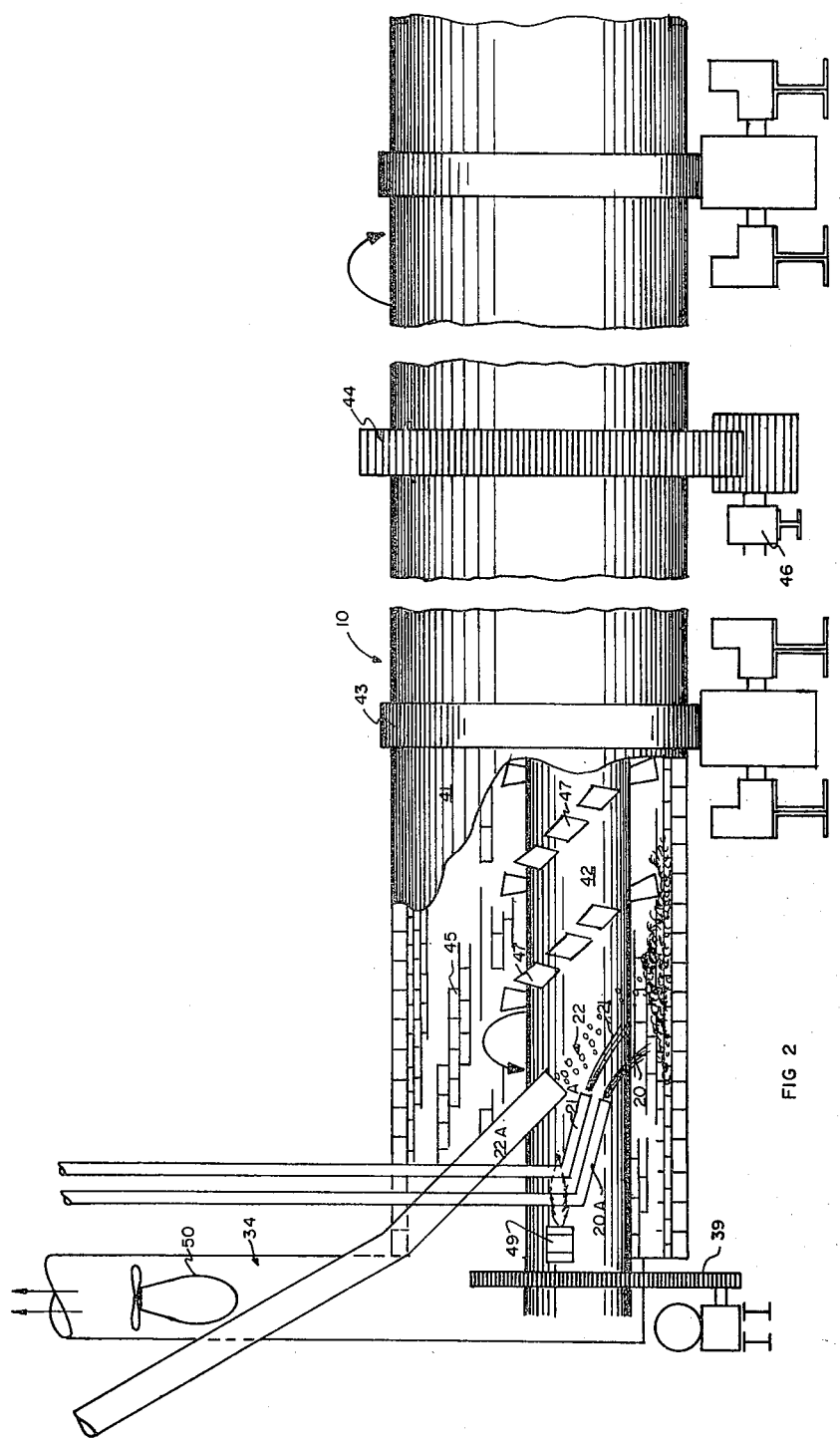
FIG. 2 is a perspective view, partially in section, of a rotary kiln used to implement the process.

Referring to the flow chart of FIG. 1 and FIG. 2 the method consists of the utilization of the large rotary kiln 10, a granulator 11, and a rotary cooler 12. Feed materials include water ($H_2O$), 20, spent sulphuric acid ($H_2SO_4$), 21, potash (KCl), 22, which are inserted into the rotary kiln in a manner which will be described later. The kiln 10 is approximately 35 feet long, 6 feet in diameter, and is fired by natural gas burners 49 generating approximately 12 to 16 million BTU per hour. The kiln 10 is rotated by a gear means 39 and a chemical reaction takes place such that the resultant product, potassium sulphate ($K_2SO_4$) fertilizer is created and discharged at 26 into the granulator 11, while hydrogen chloride (gas) (HCl) is given off at 34 and is assisted in being driven off by fan means 50. The reaction may be represented by the following equation:

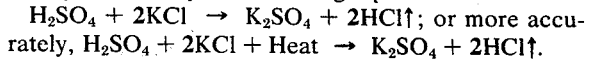

$H_2SO_4 + 2KCl \rightarrow K_2SO_4 + 2HCl\uparrow$; or more accurately, $H_2SO_4 + 2KCl + Heat \rightarrow K_2SO_4 + 2HCl\uparrow$.

The resultant fertilizer, $H_2SO_4$, at 26 is normally dry and a fine crystalline powder. In order to make it commercially acceptable and to aid in delivery and packaging, it is pelletized by the use of the granulator 11; thus, the output 26 is mixed in the granulator 11 with water 27, and granulating 28, as those skilled in the art will know. The resultant range size of pellets, leaving the granulator 11, are preferably in the range of 6-10 mesh and are moist at the output 29. They are then sent through a rotary dryer 29' and are discharged hot at 30 and thereafter are cooled in the rotary cooler 12 and placed into bulk storage at 31 for shipment as required.

Typical examples of operating conditions are as follows:

EXAMPLE

| KILN (10) | CONSUMPTION |
|---|---|
| spent sulphuric acid (approximately 90% $H_2SO_4$ by weight) | 490 U.S. gal./hour |
| potash (KCl) | 5 Ton/hour |
| Water ($H_2O$) | 60–180 U.S. gal./hour |
| Heat (reaction mixture temperature range 300°– 900°F) | 12–16 million BTU/hour |
| Kiln rotation | 10 r.p.m. |
| Resident time of feed material in kiln | ≈10 minutes |
| GRANULATOR (Conventional Rotary Granulator Utilizing Water and Pelletizing Agents) | |

Now the type of "spent" sulphuric acid which may be satisfactorily used within the embodiments of the present invention varies but the following are examples of typical feed materials therefor:

Source No. 1: Shell Oil Company, Toronto, Canada
$H_2SO_4$ content (by weight)    80–92%
Water content (by weight)    1.5–3.5%
Other    11.6%
Source No. 2: Lever Brothers Company, Toronto, Canada
$H_2SO_4$ (by weight) 74–77%
Sulphonic Acid (by weight) 0.01–0.2%
Specific Gravity 60/60, 1.667 – 1.706

Now the HCl gas which is given off at 34 comprises between 5–10 percent of the total air plus combustion gas composition and the mean temperature thereof is about 900°F. By conventional means the HCl is scrubbed (not shown) from the combustion gas stream and the hydrochloric acid may be created as a by-product as those skilled in the art will know.

For better understanding of the present invention, it is worthwhile to discuss briefly, with reference to FIG. 2, the construction of the rotary kiln 10 wherein the chemical reaction to produce the potassium sulphate fertilizer takes place. The kiln 10 includes in one embodiment a large outer rotary cylindrical housing 41 with a smaller offset counter rotating cylinder 42. The housing 41 rests on rotary collars 43 and is rotated, clockwise, by rotation drive means 44 connected to a prime mover 46. The interior of the housing 41 is lined with an acid brick 45 in order to contain the heat generated by the burners 49. The smaller cylinder 42 is constrained and rotated by a support ring mechanism 39 (at either end). Further, the rotating cylinder 42 has a plurality of helically circumferentially disposed paddles 47 about its exterior. The relative rotation of the cylinder 41 and 42 counter to each other, react to stir the feed materials 20, 21 and 22 from left to right and to exit the dry fertilizer at the right, 26. The feed materials 20, 21 and 22 are inserted within the interior of the outer rotary cylinder 41 by a plurality of conveying spouts respectively 20A, 21A and 22A. As the dry crystalline fertilizer is discharged from the rotary kiln at 26 the same is then conveyed to a conventional granulator where reacting agents and water are added thereto and pellets are formed. The moist pellets are conveyed at 29 into a rotary dryer 29' and the hot dry pellets discharge at 30 into a rotary cooler 12' thence the cooled pellets are stored in a bulk storage container 31.

Figure 3:
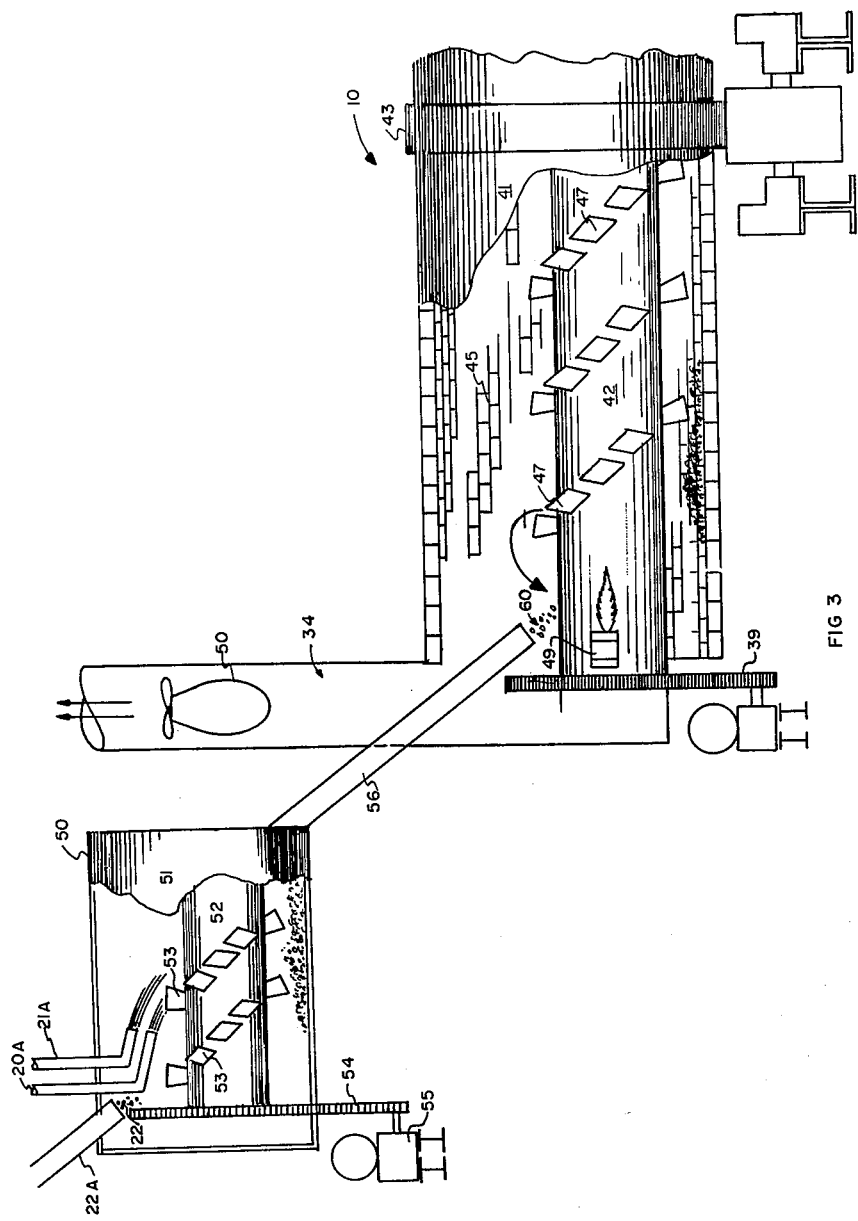
FIG. 3 is an alternative rotary kiln construction having a premixer.

Alternatively it has been found that a better quality fertilizer is obtained if the feed materials are premixed prior to insertion into the reactor kiln 10. Referring to FIG. 3 a premixer 50 is provided wherein the feed materials 20, 21 and 22 are conveyed into premixer by respective chutes 20A, 21A and 22A. The premixer 50 consists of a stationary outer cylindrical housing 51 and an inter-rotating axle 52 having a plurality of helically disposed paddles 53 radially disposed along the axle 52. The axle 52 is rotated by gear mechanism 54 as a result of the prime mover 55. The feed materials 20, 21 and 22 being mixed at room temperature in the premixer 50 are then conveyed as a liquid feed mix by a gravity spout 56 into one end of the hot interior of the fired rotary kiln 10 where the feed materials react according to the chemical equation above noted in the following manner. The liquid feed mix assumes in the premixer, a color essentially that of the sulphuric acid and hence ranges in color from an amber color (virgin sulphuric acid) to a dark brown and black for the spent sulphuric acid depending on the source of the spent sulphuric acid. For example, when the spent sulphuric acid is that of example 1; namely, from the petrochemical industry the spent sulphuric acid is black, hence the liquid feed mix is also black. The liquid feed mix on entering the rotary kiln 10 as from spout 56 becomes a slurry and the temperature in this region is approximately 300°F. As the kiln rotates the slurry begins to migrate toward the other end of the kiln and also begins to turn into a wet mass resembling wet volcanic ash and proceeds to become reasonably dry but damp as it approaches the center of the kiln. If the mix at this stage were withdrawn from the kiln it would harden into a solid black mass. As the rotary kiln continues its rotation the wet volcanic ash-like mass reverts back to a mobile paste somewhat like a grease or dark jam in the center region of the kiln where the temperature of this mass has now reached a temperature of about 200°F and probably more correctly in the range of temperatures between 300°F and 500°F. As the mass continues its migration toward the output end of the kiln the contaminates and residues of the spent sulphuric acid are driven off by the increasing temperature (since the kiln has a temperature at the input end of around 300°F and at the output end around 900°F) the mass begins to dry and to become lighter and to turn into, by the time it reaches its output end, into a whitish-grey powder which is exited at the output end 26 of the rotary kiln 10.

It should be noted that the upper limit of the temperature range can exceed 900°F by a small amount but it has been found that if the temperature range exceeds 920°F in the kiln that the quality of the product is reduced as is the production volume.

The embodiments of the invention in which an exclusive property or privilege is claimed are defined as follows:

1. A method of producing a potassium sulphate fertilizer from spent sulfuric acid having impurities therein comprising the steps of:
    a selecting as a first feed material spent sulfuric acid,
    b selecting, as a second feed material, one consisting essentially of potassium chloride;
    c mixing the first and second feed materials to achieve a feed mix;
    d heating the feed mix at an elevated temperature in excess of 300°F whereby the potassium sulphate fertilizer is created in fine crystalline powder;
    e mixing the recovered crystalline potassium sulphate with granulating agents and small amounts of water until the potassium sulphate congeals into small pellets; and f grading the pellets into a predetermined range of sizes.

2. The method of claim 1 wherein the heating step (d) takes place in the elevated temperature range of about 300°F – 920°F.

3. The method of claim 1 wherein the heating step (d) takes place in the elevated temperature range of about 300°F – 900°F.

4. The method of claim 3 wherein the feed mix is heated for approximately five minutes with continuous agitation thereof.

5. The method of claim 1 wherein the heating of step (d) takes place in the elevated temperature range of about 300°F – 900°F for approximately 10 minutes.

6. The method of claim 1, wherein the spent sulphuric acid has a sulphuric acid component, by weight, in the range of 70 percent to 98 percent.

7. The method of claim 1 wherein the spent sulfuric acid has an $H_2SO_4$ component (by weight) in the range of 70 percent – 98 percent and water is a third feed material mixed in the mixing step (c) with the first and second feed materials.

8. A method of producing potassium sulfate fertilizer from spent sulfuric acid having impurities therein utilizing a heated elongated rotary kiln having an inlet for introducing reactants at one end, a product outlet at another end and a gas outlet at the reactant outlet end, the steps comprising:

continuously introducing spent sulfuric acid, potassium chloride and water at the kiln reactant inlet end;

continuously mixing and moving said reactants in the direction of said kiln product outlet;

simultaneously, progressively raising the temperature of said reactants while mixing as the reactants travel through said kiln from its initial temperature up to about 320°F;

generating HCl gas and volatile impurities from said spent sulfuric acid;

continuously directing said evolved gases to said gas outlet; and continuously discharging fine crystalline potassium sulfate at said product outlet without recycling.

9. The method of claim 8 including the step of pelletizing said discharged potassium sulfate crystals by mixing the crystalline potassium sulfate with granulating agents and small amounts of water in a granulator until the potassium sulfate congeals into small pellets; grading the pellets into predetermined range of sizes; drying the pellets by heating, and cooling the dried pellets and recovering the pelletized potassium sulfate fertilizer.

10. The method of claim 7 including the steps of heating the predetermined range of size of pellets until they are dry, cooling the said hot pellets and recovering the pelletized potassium sulfate fertilizer.

11. A pelletized potassium sulfate fertilizer made from spent sulfuric acid according to the method of claim 1.

* * * * *